United States Patent
Bae

(10) Patent No.: US 9,958,326 B2
(45) Date of Patent: May 1, 2018

(54) SPECTROMETER AND SPECTROMETER MODULE

(71) Applicant: SAMSUNG ELECTRONICS CO., LTD., Suwon-si (KR)

(72) Inventor: Jung Mok Bae, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days. days.

(21) Appl. No.: 15/409,626

(22) Filed: Jan. 19, 2017

(65) Prior Publication Data

US 2018/0080823 A1    Mar. 22, 2018

(30) Foreign Application Priority Data

Sep. 21, 2016  (KR) .................. 10-2016-0120861

(51) Int. Cl.
*G01N 21/25* (2006.01)
*G01J 3/12* (2006.01)
*G02F 1/167* (2006.01)

(52) U.S. Cl.
CPC ............. *G01J 3/12* (2013.01); *G02F 1/167* (2013.01); *G01J 2003/1269* (2013.01); *G02F 2202/32* (2013.01); *G02F 2203/055* (2013.01)

(58) Field of Classification Search
CPC .... G02B 26/00; G02B 5/28; G01J 3/26; G01J 3/28; G01J 3/30; G01J 3/38; G01J 3/02; G01J 3/12; G02F 1/167
See application file for complete search history.

(56) References Cited

U.S. PATENT DOCUMENTS

| | | | |
|---|---|---|---|
| 6,809,864 B2 | 10/2004 | Martynov et al. | |
| 7,054,056 B2 | 5/2006 | Tsukamoto | |
| 8,274,653 B2 | 9/2012 | Nakamura et al. | |
| 8,854,624 B2 | 10/2014 | Pervez et al. | |
| 8,947,657 B2 * | 2/2015 | Letant .................. | G01N 21/658 356/301 |
| 9,366,571 B2 | 6/2016 | Pervez et al. | |
| 9,677,936 B2 | 6/2017 | Han et al. | |
| 2001/0052977 A1 | 12/2001 | Toyooka | |

(Continued)

FOREIGN PATENT DOCUMENTS

| | | |
|---|---|---|
| EP | 2942618 A1 | 11/2015 |
| JP | 2001-228024 A | 8/2001 |
| JP | 2009-121935 A | 6/2009 |

(Continued)

OTHER PUBLICATIONS

Babak Momeni, et al., "Planar photonic crystal microspectrometers in silicon-nitride for the visible range", Optics Express, vol. 17, No. 19, Sep. 14, 2009, Optical Society of America, pp. 17060-17069.

(Continued)

*Primary Examiner* — Abdullahi Nur
(74) *Attorney, Agent, or Firm* — Sughrue Mion, PLLC

(57) ABSTRACT

A spectrometer and a spectrometer module are provided. The spectrometer includes a bandpass filter including a photonic crystal layer having a reflection wavelength or a transmission wavelength that varies based on an electrical stimulation, the bandpass filter being configured to filter light. The spectrometer further includes a photodetector configured to detect the filtered light.

16 Claims, 11 Drawing Sheets

(56) References Cited

U.S. PATENT DOCUMENTS

2009/0034051 A1    2/2009  Arsenault et al.
2013/0050620 A1*   2/2013  Shin .................. G02F 1/133514
                                                           349/106

FOREIGN PATENT DOCUMENTS

JP       2013-213838 A    10/2013
JP       2015-219122 A    12/2015
WO       2012088117 A1    6/2012

OTHER PUBLICATIONS

Kurt M. Bryan, et al., "Inexpensive photonic crystal spectrometer for colorimetric sensing applications", Optics Express, vol. 21, No. 4, Feb. 25, 2013, Optical Society of America, pp. 4411-4423.
Nadia K. Pervez, et al., "Photonic crystal spectrometer", Optics Express, vol. 18, No. 8, Apr. 12, 2010, Optical Society of America, pp. 8277-8285.
Communication dated Sep. 26, 2017, issued by the European Patent Office in counterpart European Application No. 17156209.3.
Moon Gyu Han, et al., "Full Color Tunable Photonic Crystal from Crystalline Colloidal Arrays with an Engineered Photonic Stop-Band", Advanced Materials, vol. 24, No. 48, Dec. 18, 2012, pp. 6438-6444, XP055407273.
Shin-Hyun Kim, et al., "Integration of Colloidal Photonic Crystals toward Miniaturized Spectrometers", Advanced Materials, vol. 22, No. 9, Dec. 8, 2009, pp. 946-950, XP055407151.
Andre C. Arsenault, et al., "Photonic-crystal full-colour displays", Nature Photo, Nature Publishing Group, UK, vol. 1, No. 8, Aug. 1, 2007, pp. 468-472, XP008141615.

* cited by examiner

SPECTROMETER AND SPECTROMETER MODULE

CROSS-REFERENCE TO RELATED APPLICATION

This application claims priority from Korean Patent Application No. 10-2016-0120861, filed on Sep. 21, 2016, in the Korean Intellectual Property Office, the disclosure of which is incorporated herein by reference in its entirety.

BACKGROUND

1. Field

Apparatuses consistent with example embodiments relate to a spectrometer and a spectrometer module.

2. Description of Related Art

The currently most discussed non-invasive blood glucose measurement method is an optical method. There are two methods as the most promising optical methods for non-invasive blood glucose measurement: one is a near infrared (NIR) absorption spectrometry and the other is Raman analysis.

The NIR absorption spectrometry is a method of estimating blood glucose by analyzing light emitted back from the skin by diffused reflection after broadband near-infrared light irradiation to the skin, and calculating the amount of light absorbed by the blood glucose molecules in the skin. The Raman analysis is a method of analyzing blood glucose by irradiating laser to an object and obtaining a Raman shift through a wavelength analysis of light emitted from the object. Both methods use a bulky grating to analyze a spectrum of light.

As such, a spectrometer uses a grating, and a considerable space is used until the light that has been spectrally separated by the grating reaches a photodetector to secure a resolution. Due to such volumetric characteristics of the spectrometer, there are many limitations in the fabrication of a subminiature non-invasive blood glucose sensor.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to an aspect of an example embodiment, there is provided a spectrometer including a bandpass filter including a photonic crystal layer having a reflection wavelength or a transmission wavelength that varies based on an electrical stimulation, the bandpass filter being configured to filter light. The spectrometer further includes a photodetector configured to detect the filtered light.

The photonic crystal layer may include colloidal particles, and spacing between the colloidal particles may vary based on the electrical stimulation.

The colloidal particles may have a core-shell structure.

The colloidal particles may include any one of or any combination of metal particles, polymer particles, inorganic particles, and semiconductor particles.

The colloidal particles may include any one or any combination of silica, polymethylmethacrylate, polystyrene, titanium oxide, graphite, diamond, $C_{60}$, fullerene, graphene, carbon nanotube, silicon, silicon carbide, germanium, metal chalcogenide, metal boride, metal phosphide, metal silicide, metal nitride, iron oxide, tin oxide, antimony doped tin oxide, zinc oxide, and a copolymer thereof.

The colloidal particles may be electrically charged.

The photonic crystal layer may further include a responsive material configured to expand and contract based on the electrical stimulation.

The responsive material may be a conductive polymer.

The conductive polymer may include any one or any combination of polyferrocenylsilane, polythiophene, polypyrrole, polyaniline, polyphenylenevinylene, polyacetylene, polyfluorene, polyvinylidene difluoride, and a copolymer thereof.

The bandpass filter may further include an upper substrate and a lower substrate, and the photonic crystal layer may be interposed between the upper substrate and the lower substrate.

The bandpass filter may further include an upper electrode disposed on the upper substrate, and a lower electrode disposed on the lower substrate.

The photodetector may be a single photodiode.

The spectrometer may further include a spectrum scanner configured to apply the electrical stimulation to the photonic crystal layer to measure optical intensities of different wavelengths.

The spectrometer may further include a spectrum generator configured to generate a spectrum, based on the measured optical intensities of the different wavelengths.

According to an aspect of another example embodiment, there is provided a spectrometer module including a light source configured to irradiate first light onto an object, and a spectrometer configured to receive second light that is scattered from the object onto which the first light is irradiated, and measure a spectrum, based on the received second light. The spectrometer further includes a processor configured to analyze a physical property of the object, based on the measured spectrum. The spectrometer includes a bandpass filter including a photonic crystal layer having a reflection wavelength or a transmission wavelength that varies based on an electrical stimulation, the bandpass filter being configured to filter the received second light. The spectrometer further includes a photodetector configured to detect the filtered second light.

The photonic crystal layer may include colloidal particles, and spacing between the colloidal particles may vary based on the electrical stimulation.

The photonic crystal layer may further include a responsive material configured to expand and contract based on the electrical stimulation.

The scattered second light may be reflected from the object onto which the first light is irradiated, or transmitted through the object onto which the first light is irradiated.

The physical property of the object may be analyzed based on near-infrared absorption spectrometry or a Raman analysis.

According to an aspect of still another example embodiment, there is provided a spectrometer including a bandpass filter including a photonic crystal layer configured to reflect a first light of a first wavelength, based on a voltage being applied to the photonic crystal layer, and reflect a second light of a second wavelength, based on the voltage not being applied to the photonic crystal layer. The spectrometer further includes a photodetector configured to detect the reflected first light and the reflected second light.

The photonic crystal layer may include colloidal particles, spacing between the colloidal particles may be decreased to reflect the first light, based on the voltage being applied to the photonic crystal layer, and the spacing between the colloidal particles may be increased to reflect the second light, based on the voltage not being applied to the photonic crystal layer.

The photonic crystal layer may include colloidal particles and a responsive material, and the responsive material may be configured to expand to increase spacing between the colloidal particles to reflect the first light, based on the voltage being applied to the photonic crystal layer, and contract to decrease the spacing between the colloidal particles to reflect the second light, based on the voltage not being applied to the photonic crystal layer.

BRIEF DESCRIPTION OF THE DRAWINGS

The above and/or other aspects will be more apparent by describing example embodiments with reference to the accompanying drawings.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
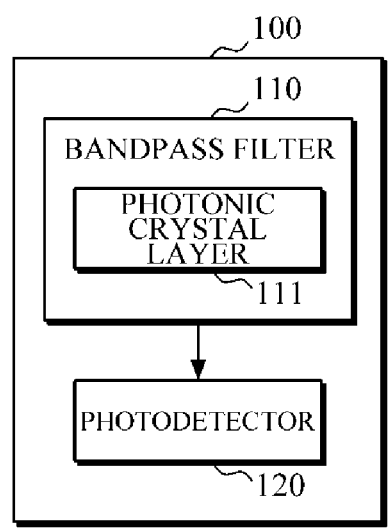
FIG. 1 is a block diagram illustrating a spectrometer according to an example embodiment.

FIG. 1 is a block diagram illustrating a spectrometer 100 according to an example embodiment.

Referring to FIG. 1, the spectrometer 100 includes a bandpass filter 110 and a photodetector 120.

The bandpass filter 110 may have a transmission wavelength that varies according to an electrical stimulation. For example, a transmission wavelength of the bandpass filter 110 may be increased or decreased with an increase in the applied voltage. To this end, the bandpass filter 110 may include a photonic crystal layer 111 whose reflection wavelength or transmission wavelength may vary according to an electrical stimulation.

In this case, the photonic crystal layer 111 may include a plurality of colloidal particles. According to the change in voltage applied to the photonic crystal layer 111, the spacing between the colloidal particles may vary, and accordingly, the reflection wavelength band or the transmission wavelength band of the photonic crystal layer 111 may also vary. To this end, the photonic crystal layer 111 may include electrically charged colloidal particles or a responsive material that expands or contracts with the change in voltage. That is, the spacing between the colloidal particles of the photonic crystal layer 111 may be changed using the electrically charged colloidal particles or using the responsive material that expands or contracts with the change in voltage.

Here, the responsive material may be a conductive polymer. For example, the responsive material may include polythiophene, polypyrrole, polyaniline, polyphenylenevinyilene, polyacetylene, polyfluorene, polyvinylidene difluoride, polyferrocenylsilane, and a copolymer thereof.

According to an example embodiment, the colloidal particles may include metal particles, polymer particles, inorganic particles, semiconductor particles, etc. For example, the colloidal particles may include silica, polymethylmethacrylate, polystyrene, titanium oxide, graphite, diamond, $C_{60}$, fullerene, graphene, carbon nanotube, silicon, silicon carbide, germanium, metal chalcogenide, metal boride, metal phosphide, metal silicide, metal nitride, iron oxide, tin oxide, antimony doped tin oxide, zinc oxide, and a copolymer thereof.

In addition, the colloidal particles may be in the form of a sphere, an oval, a tube, a wire, a sheet, or the like. The colloidal particles may have a core-shell structure.

The photodetector 120 may detect light filtered by the bandpass filter 110. According to an example embodiment, the photodetector 120 may be implemented by a single photodiode.

Figure 2:
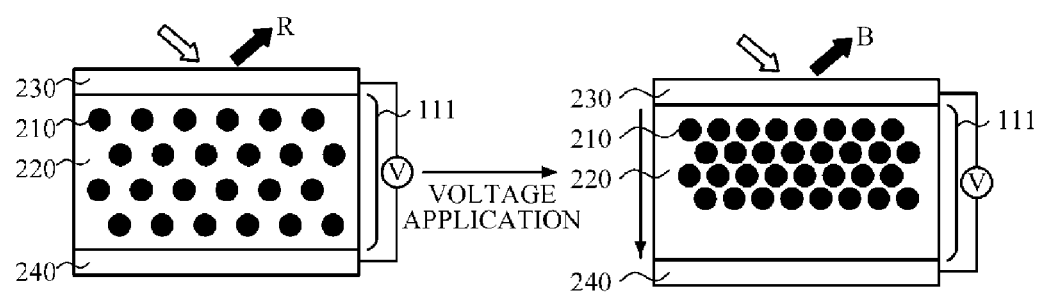
FIG. 2 is a diagram illustrating a change in a spacing between colloidal particles according to a change in a voltage applied to a photonic crystal layer, according to an example embodiment.

FIG. 2 is a diagram illustrating a change in a spacing between colloidal particles according to a change in a voltage applied to the photonic crystal layer 111, according to an example embodiment. FIG. 2 illustrates an example of using electrically charged colloidal particles.

Referring to FIG. 2, the photonic crystal layer 111 includes colloidal particles 210 and a solvent 220, and the colloidal particles 210 may be electrically charged and dispersed in the solvent 220. In this case, the solvent 220 may be an inorganic solvent, such as water. The colloidal particles 210 may be produced by applying an electrical stimulation to metal particles, or may be produced using a polar material that has its own polarity on the surface thereof. For example, a zeta potential of about −70 mV may naturally occur on the surface of polystyrene nanoparticles having a diameter of about 135 nm. The colloidal particles 210 having an electrically charged surface are self-aligned due to repulsion therebetween. As a result, the colloidal particles 210 in the solvent 220 may be arranged in a periodic structure having a constant interval, as shown in the left side of FIG. 2. Due to the periodic arrangement, the colloidal particles 210 dispersed in the solvent 220 have a photonic crystal characteristic.

When a voltage is applied to the photonic crystal layer 111 through two electrodes 230 and 240, the negatively charged colloidal particles 210 move toward the positive pole. In the illustrated example, an upper electrode 230 is applied a positive (+) voltage and a lower electrode 240 is applied a negative (−) voltage. However, the aspect of the present disclosure is not limited to the above example, such that the positively charged colloidal particles 13 may be dispersed in the solvent 220 and a negative (−) voltage may be applied to the upper electrode 230. When the colloidal particles 210 are gathered in the upper electrode 11, the spacing between the colloidal particles 210 becomes narrow. As a result, the reflection wavelength band or the transmission wavelength band of the photonic crystal layer 111 also changes. In the illustrated example, light of a red wavelength R is reflected before the voltage application, and light of a blue wavelength B is reflected after the voltage application.

Figure 3:
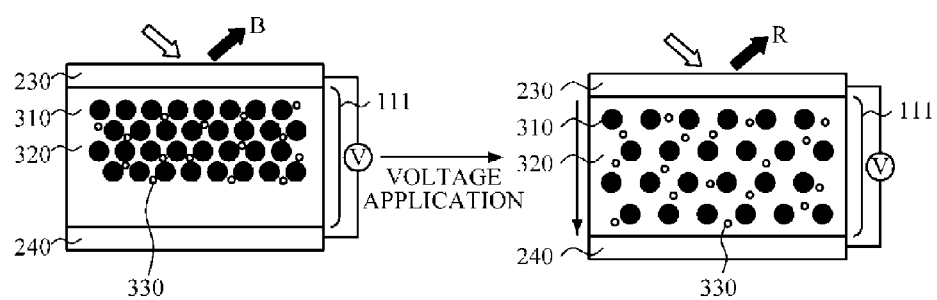
FIG. 3 is a diagram illustrating a change in a spacing between colloidal particles according to a change in a voltage applied to a photonic crystal layer, according to another example embodiment.

FIG. 3 is a diagram illustrating a change in a spacing between colloidal particles according to a change in a voltage applied to the photonic crystal layer 111, according to another example embodiment. FIG. 3 illustrates an example of using a responsive material.

Referring to FIG. 3, the photonic crystal layer 111 includes colloidal particles 310, a solvent 320, and a responsive material 330, and the colloidal particles 310 in the solvent may be arranged in a periodic structure having a constant interval. In this case, the solvent 320 may use an electrolyte solution in which electricity can be carried by the movement of ions.

Here, the responsive material 330 may be a conductive polymer that expands or contracts with the change in voltage. For example, the responsive material may include polythiophene, polypyrrole, polyaniline, polyphenylenevinyilene, polyacetylene, polyfluorene, polyvinylidene difluoride), polyferrocenylsilane, and a copolymer thereof.

When a voltage is applied to the photonic crystal layer 111 through two electrodes 230 and 240, the responsive material 330 in the photonic crystal layer 111 expands so that the spacing between colloidal particles 310 is increased. As a result, the reflection wavelength band or the transmission wavelength band of the photonic crystal layer 111 also changes. In the illustrated example, light of a blue wavelength B is reflected before the voltage application, and light of a red wavelength R is reflected after the voltage application.

Figure 4:
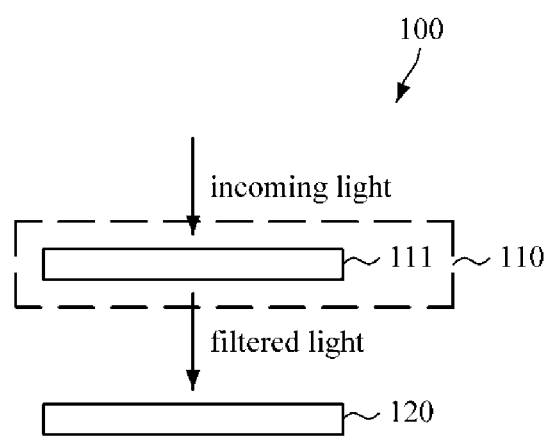
FIG. 4 is a diagram of an optical arrangement of a spectrometer, according to an example embodiment.

FIG. 4 is a diagram illustrating an optical arrangement of the spectrometer 100, according to an example embodiment. FIG. 4 illustrates that the photonic crystal layer 111 of the spectrometer 100 is implemented as a transmission type.

Referring to FIG. 4, an optical system may be configured such that the photodetector 120 detects light that is transmitted through the photonic crystal layer 111.

The photonic crystal layer 111 may have a transmission wavelength that varies according to an electrical stimulation. Incoming light incident on the photonic crystal layer is filtered according to the transmission wavelength band of the photonic crystal layer 111 so that only the light in a transmission wavelength band is transmitted through the photonic crystal layer 111. The light transmitted through the photonic crystal layer 111 is detected by the photodetector 120. That is, the spectrometer 100 may employ an optical system configuration in which light transmitted through the photonic crystal layer 111 is incident on the photodetector 120.

Figure 5:
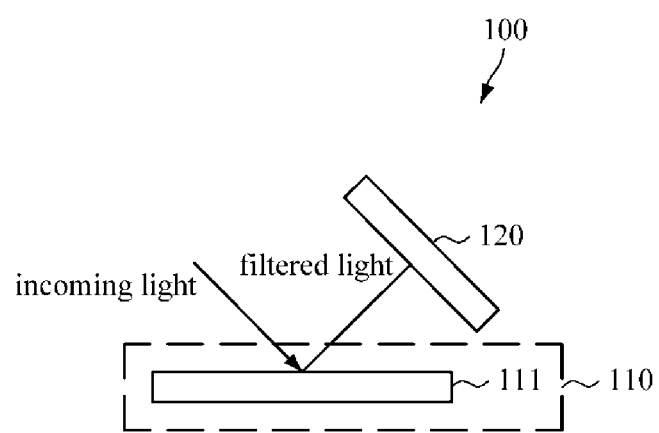
FIG. 5 is a diagram illustrating an optical arrangement of a spectrometer, according to another example embodiment.

FIG. 5 is a diagram illustrating an optical arrangement of the spectrometer 100, according to another example embodiment. FIG. 5 illustrates an example embodiment in which the photonic crystal layer 111 of the spectrometer 100 is implemented as a reflection-type.

Referring to FIG. 5, an optical system may be configured such that the photodetector 120 detects light reflected from the photonic crystal layer 111.

The photonic crystal layer 111 may have a reflection wavelength that varies according to an electrical stimulation. Incoming light incident on the photonic crystal layer 111 is filtered according to the reflection wavelength band of the photonic crystal layer 111 so that only the light in a reflection wavelength band is reflected from the photonic crystal layer 111. The light reflected from the photonic crystal layer 111 is detected by the photodetector 120. That is, the spectrometer 100 may employ an optical system configuration in which the light reflected from the photonic crystal layer 111 is incident on the photodetector 120.

Figure 6:
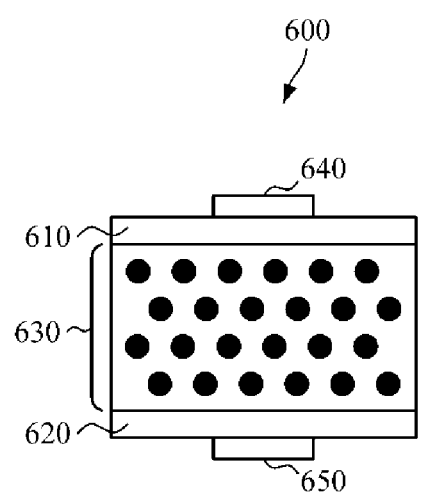
FIG. 6 is a diagram illustrating a bandpass filter according to an example embodiment.

FIG. 6 is a diagram illustrating a bandpass filter 600 according to an example embodiment.

Referring to FIG. 6, the bandpass filter 600 includes an upper substrate 610, a lower substrate 620, a photonic crystal layer 630 interposed between the upper substrate 610 and the lower substrate 620, an upper electrode 640 disposed on the upper substrate 610, and a lower electrode 650 disposed on the lower substrate 620.

The upper substrate 610 and the lower substrate 620 may be formed of transparent glass or plastic, to not affect the propagation of light, and the upper electrode 640 and the lower electrode 650 may be made of a transparent conductive material, such as indium tin oxide (ITO) or indium zinc oxide (IZO), to not affect the propagation of light.

The reflection wavelength or the transmission wavelength of the photonic crystal layer 630 may vary according to an electrical stimulation, i.e., a voltage applied through the upper electrode 640 and the lower electrode 650. The photonic crystal layer 630 may include a plurality of colloidal particles. The spacing between the colloidal particles may vary according to a change in the voltage applied to the photonic crystal layer 610, and accordingly, the reflection wavelength band or the transmission wavelength band of the photonic crystal layer 610 may also change. To this end, the photonic crystal layer 610 may include electrically charged colloidal particles or a responsive material that expands or contracts with the change in voltage. That is, the spacing between the colloidal particles in the photonic crystal layer 610 may be changed using the electrically charged colloidal particles or the responsive material that expands or contracts with the change in voltage.

In this case, the responsive material may be a conductive polymer. For example, the responsive material may include polythiophene, polypyrrole, polyaniline, polyphenylenevinyilene, polyacetylene, polyfluorene, polyvinylidene difluoride, polyferrocenylsilane, and a copolymer thereof.

The colloidal particles may include metal particles, polymer particles, inorganic particles, semiconductor particles, etc. For example, the colloidal particles may include silica, polymethylmethacrylate, polystyrene, titanium oxide, graphite, diamond, $C_{60}$, fullerene, graphene, carbon nanotube, silicon, silicon carbide, germanium, metal chalcogenide, metal boride, metal phosphide, metal silicide, metal nitride, iron oxide, tin oxide, antimony doped tin oxide, zinc oxide, and a copolymer thereof.

In addition, the colloidal particles may be in the form of a sphere, an oval, a tube, a wire, a sheet, or the like. The colloidal particles may have a core-shell structure.

Figure 7:
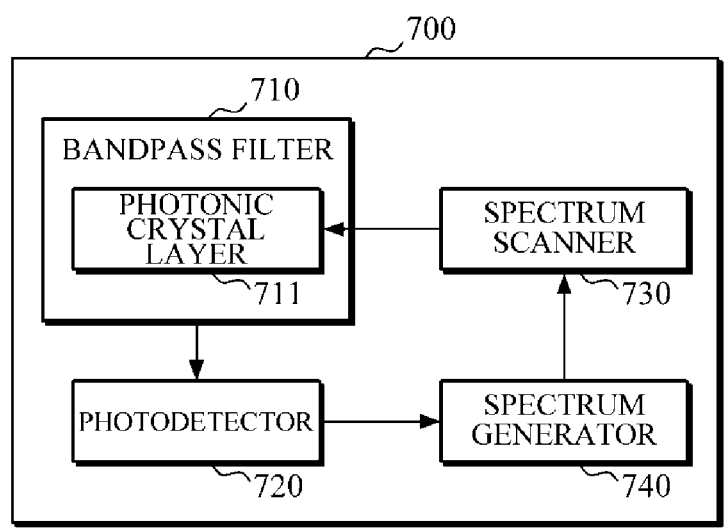
FIG. 7 is a block diagram illustrating a spectrometer according to another example embodiment.

FIG. 7 is a block diagram illustrating a spectrometer 700 according to another example embodiment.

Referring to FIG. 7, the spectrometer 700 includes a bandpass filter 710, a photodetector 720, a spectrum scanner 730, and a spectrum generator 740.

The bandpass filter 710 may have a transmission wavelength that varies according to an electrical stimulation. For example, in the bandpass filter 710, a transmission wavelength may be increased or decreased with an increase in the applied voltage. To this end, the bandpass filter 710 may include a photonic crystal layer 711 whose reflection wavelength or transmission wavelength may vary according to an electrical stimulation.

In this case, the photonic crystal layer 711 may include a plurality of colloidal particles. According to the change in voltage applied to the photonic crystal layer 711, the spacing between the colloidal particles may vary, and accordingly, the reflection wavelength band or the transmission wavelength band of the photonic crystal layer 711 may also vary. To this end, the photonic crystal layer 711 may include electrically charged colloidal particles or a responsive material that expands or contracts with the change in voltage. That is, the spacing between the colloidal particles of the photonic crystal layer 711 may be changed using the electrically charged colloidal particles or using the responsive material that expands or contracts with the change in voltage.

Here, the responsive material may be a conductive polymer. For example, the responsive material may include polythiophene, polypyrrole, polyaniline, polyphenylenevinyilene, polyacetylene, polyfluorene, polyvinylidene difluoride, polyferrocenylsilane, and a copolymer thereof.

According to an example embodiment, the colloidal particles may include metal particles, polymer particles, inorganic particles, semiconductor particles, etc. For example, the colloidal particles may include silica, polymethylmethacrylate, polystyrene, titanium oxide, graphite, diamond, $C_{60}$, fullerene, graphene, carbon nanotube, silicon, silicon carbide, germanium, metal chalcogenide, metal boride, metal phosphide, metal silicide, metal nitride, iron oxide, tin oxide, antimony doped tin oxide, zinc oxide, and a copolymer thereof.

In addition, the colloidal particles may be in the form of a sphere, an oval, a tube, a wire, a sheet, or the like. The colloidal particles may have a core-shell structure.

The photodetector 720 may detect light filtered by the bandpass filter 710. According to an example embodiment, the photodetector 720 may be implemented by a single photodiode.

The spectrum scanner 730 may apply an electrical stimulation to the photonic crystal layer 711 to detect light of various wavelengths and measure optical intensities of various wavelengths. Because the transmission wavelength of the bandpass filter 710, i.e., the reflection wavelength or the transmission wavelength of the photonic crystal layer 711, varies according to an electrical stimulation, the spectrum scanner 730 may adjust the transmission wavelength of the bandpass filter 710 by controlling a voltage applied to the photonic crystal layer 711.

The spectrum generator 740 may measure an optical intensity of each wavelength on the basis of the light detected by the photodetector 720 and generate a spectrum by converting the measured optical intensity into spectral data. In this case, the spectrum generator 740 may take into account bandpass characteristic information of each wavelength of the bandpass filter 710 when generating the spectrum.

Figure 8:
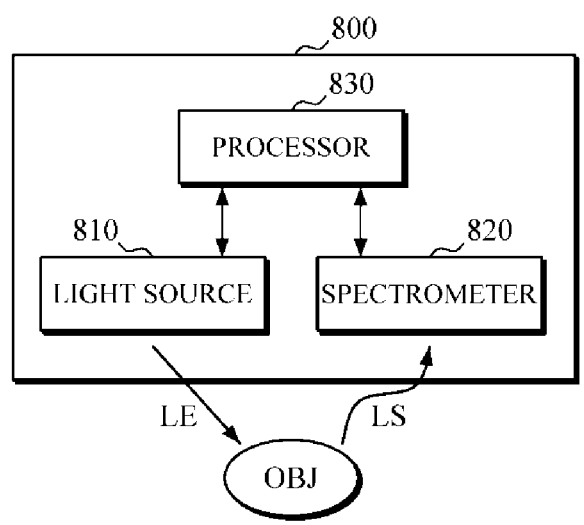
FIG. 8 is a block diagram illustrating a spectrometer module according to an example embodiment.

FIG. 8 is a block diagram illustrating a spectrometer module 800 according to an example embodiment.

Referring to FIG. 8, the spectrometer module 800 includes a light source 810, a spectrometer 820, and a processor 830.

The light source 810 may emit excitation light (LE) to an object (OBJ). To this end, the light source 810 may include at least one optical element that directs the light source and the light emitted from the light source to a desired position of the object OBJ. The light source may be configured to emit light in a wavelength band suitable for the property to be analyzed from the object OBJ. For example, the light source may emit light in a near-infrared band, for example, near-infrared light in the wavelength band of about 800 nm to 2500 nm. According to an example embodiment, the light source may be implemented as a light emitting diode or a laser light source.

The spectrometer 820 may receive light scattered from the irradiated object OBJ and measure a spectrum. For example, the spectrometer 820 may be the spectrometer 700 that is described with reference to FIGS. 1 to 7.

The processor 730 may analyze physical properties of the object OBJ on the basis of the spectrum measured by the spectrometer 720. For example, the processor 730 may analyze the physical properties of the object OBJ, using near-infrared absorption spectrometry or Raman analysis.

In the near-infrared absorption spectrometry, after the object OBJ is irradiated with broadband near-infrared light, the light emitted back from the skin by diffused reflection is analyzed, and the amount of light absorbed by molecules of blood glucose inside the skin is calculated to estimate a blood glucose level. The Raman analysis is a method of analyzing blood glucose by irradiating laser to the object OBJ and obtaining a Raman shift through a wavelength analysis of light emitted from the object OBJ. The Raman analysis uses scattering, e.g., inelastic scattering, in which light incident into the object OBJ collides with atoms or molecules in the object OBJ and is scattered in various directions. This scattering does not refer to the reflection of light from surfaces of atoms or molecules, but the light is absorbed by the atoms or molecules and then emitted, and the scattered light (LS) has a longer wavelength than the wavelength of the incident light. This difference in wavelength may be less than about 200 nm. By analyzing the spectrum of the scattered light, various physical properties, such as oscillation of molecules in the object OBJ, the structure of molecules, and the like, may be identified.

The spectrometer 820 and the processor 830 may be connected by a cable or a wireless connection. For example, the spectrometer module 800 may be implemented as a compact portable device in which the spectrometer 820 and the processor 830 are connected in a wired manner. Alternatively, the processor 830 may be mounted in a mobile terminal and configured to perform a wireless communication with the spectrometer 820.

Figure 9:
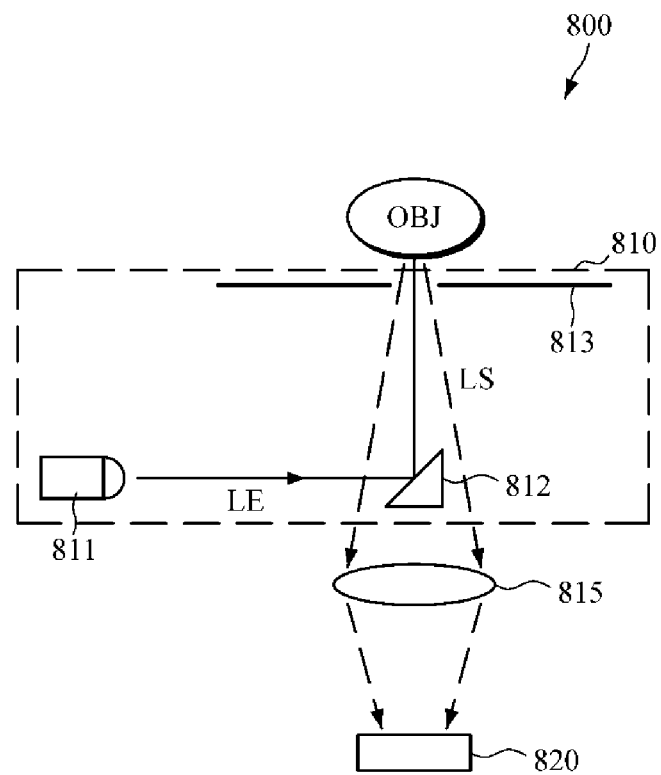
FIG. 9 is a diagram illustrating an optical arrangement of the spectrometer module of FIG. 8, according to an example embodiment.

FIG. 9 is a diagram illustrating an optical arrangement of the spectrometer module 800 of FIG. 8, according to an example embodiment.

Referring to FIG. 9, the spectrometer module 800 is of a reflection-type, in which an optical system may be configured such that the spectrometer 820 detects scattered light LS reflected from the object OBJ. In the illustrated example, the spectrometer module 800 further includes an optical lens 815 that collects the scattered light LS from the object OBJ into the spectrometer 820. However, the optical lens 815 may be omitted according to an example embodiment.

The light source 810 may include a light source 811, an optical path changer 812, a diaphragm 813, and the like. Although the optical path changer 812 is illustrated as in the form of a prism, this is an example, and the optical path changer 812 may be in the form of a beam splitter or a plane mirror. The optical path changer 812 may be omitted according to the arrangement position of the light source 811.

Excitation light LE emitted from the light source 811 collides with the molecular structure in the object OBJ, is absorbed by the molecular structure, then is released again and is emitted from the object OBJ in the form of wavelength-converted scattered light LS. The scattered light LS, that is, a bio-optical signal, includes various spectra having different degrees of wavelength conversion according to the molecular states in the object OBJ. The spectrometer module 800 employs an optical system configuration in which the scattered light LS emitted along the same path as the path along which the excitation light LE is incident on the object OBJ is incident on the spectrometer 820, and the spectrometer module 800 may further include an additional optical element that diverges the scattered light LS toward the spectrometer 820.

Figure 10:
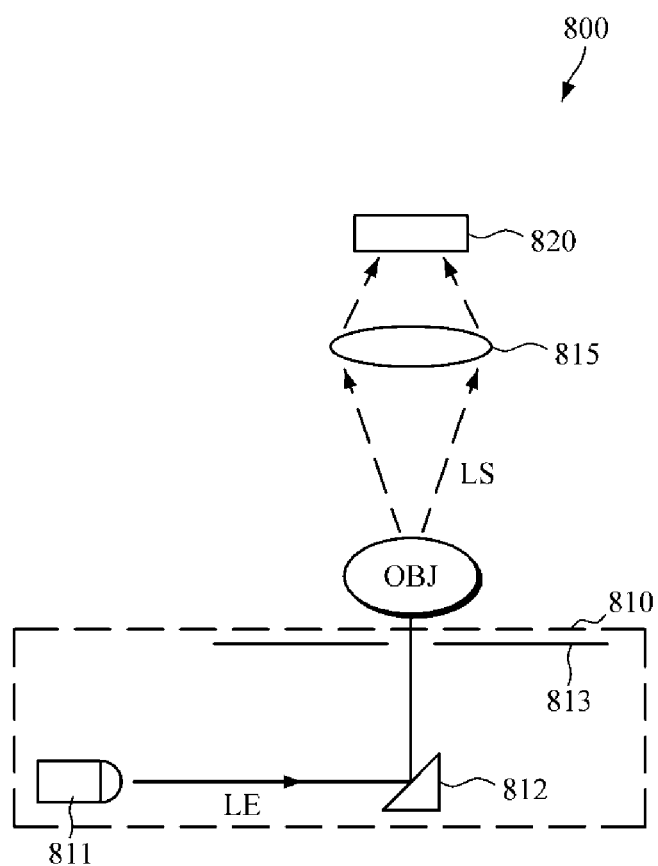
FIG. 10 is a diagram illustrating an optical arrangement of the spectrometer module of FIG. 8, according to another example embodiment.

FIG. 10 is a diagram illustrating an optical arrangement of the spectrometer module 800 of FIG. 8, according to another example embodiment.

Referring to FIG. 10, the spectrometer module 800 is of a transparent-type, and an optical system may be configured such that the spectrometer 820 detects scattered light LS transmitted through the object OBJ. Although in the illustrated example, the spectrometer module 800 further includes an optical lens 815 that collects the scattered light LS from the object OBJ into the spectrometer 820, the optical lens 815 may be omitted according to an example embodiment.

The light source 810 may include a light source 811, an optical path changer 812, a diaphragm 813, and the like. Although the optical path changer 812 is illustrated as in the form of a prism, this is an example, and the optical path changer 812 may be in the form of a beam splitter or a plane mirror. The optical path changer 812 may be omitted according to the arrangement position of the light source 811.

Excitation light LE emitted from the light source 811 collides with the molecular structure in the object OBJ, is absorbed by the molecular structure, then is released again and is emitted from the object OBJ in the form of wavelength-converted scattered light LS. The scattered light LS, that is, a bio-optical signal, includes various spectra having different degrees of wavelength conversion according to the molecular states in the object OBJ. The spectrometer module 800 employs an optical system configuration in which the scattered light LS transmitted through the object OBJ is incident on the spectrometer 820.

Figure 11:
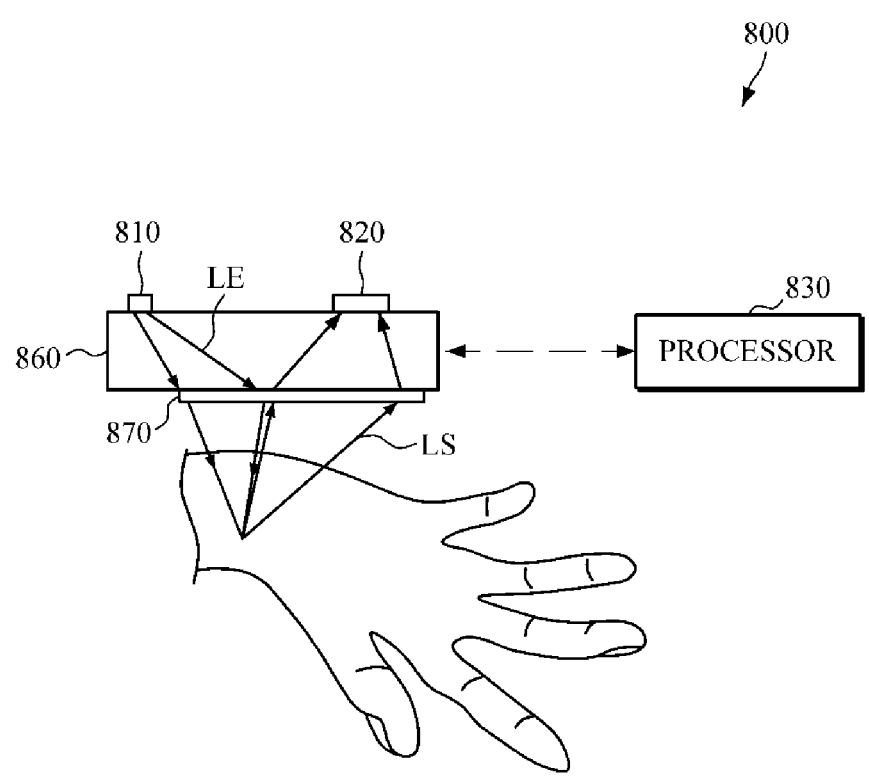
FIG. 11 is a diagram illustrating an optical arrangement of the spectrometer module of FIG. 8, according to still another example embodiment.

FIG. 11 is a diagram illustrating an optical arrangement of the spectrometer module 800 of FIG. 8, according to still another example embodiment.

Referring to FIG. 11, the spectrometer module 800 further includes a base 860, and a light source 810 and a spectrometer 820 may be disposed on the same or different surfaces of the base 860.

According to an example embodiment, the base 860 may be made of a transparent material, and the light source 810 and the spectrometer 820 may be arranged at a distant from each other on one surface of the base 860. That is, the light source 810 may be arranged to irradiate excitation light LE to the object OBJ through the base 860, and the spectrometer 820 may be arranged to detect scattered light LS from the object OBJ passing through the base 860 and incident thereon.

In this case, an optical lens 870 that focuses the excitation light LE from the light source 810 onto the object OBJ and focuses the scattered light LS from the object OBJ onto the spectrometer 820 may be further provided on the other surface of the base 860.

The base 860 may be made of a flexible material. In this case, the spectrometer module 800 may be implemented in the form wearable on the object OBJ. For example, the spectrometer module 800 may be implemented as a wristwatch or wristband-type non-invasive blood glucose sensor.

The processor 830 may be connected with the spectrometer 820 by a cable or a wireless connection. The processor 830 may be mounted on the base 860 together with the spectrometer 820 to constitute a wristwatch or wristband-type wearable device.

Alternatively, the spectrometer module 800 may be implemented such that only the light source 810 and the spectrometer 820 are configured to be part of a wristwatch or wristband-type wearable device, and the processor 830 is mounted in another device.

The example embodiments can be implemented as computer readable codes in a computer readable record medium. Codes and code segments constituting the computer program can be easily inferred by a skilled computer programmer in the art. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A spectrometer comprising:
   a bandpass filter comprising a photonic crystal layer having a reflection wavelength or a transmission wavelength that varies based on an electrical stimulation, the bandpass filter being configured to filter light; and
   a photodetector configured to detect the filtered light,
   wherein the photonic crystal layer comprises colloidal particles and a responsive material, and
   the responsive material is configured to:
      expand to increase spacing between the colloidal particles to reflect a first light of a first wavelength, based on a voltage being applied to the photonic crystal layer; and
      contract to decrease the spacing between the colloidal particles to reflect a second light of a second wavelength, based on the voltage not being applied to the photonic crystal layer.

2. The spectrometer of claim 1, wherein the colloidal particles have a core-shell structure.

3. The spectrometer of claim 1, wherein the colloidal particles comprise any one of or any combination of metal particles, polymer particles, inorganic particles, and semiconductor particles.

4. The spectrometer of claim 3, wherein the colloidal particles comprise any one or any combination of silica, polymethylmethacrylate, polystyrene, titanium oxide, graphite, diamond, C60, fullerene, graphene, carbon nanotube, silicon, silicon carbide, germanium, metal chalcogenide, metal boride, metal phosphide, metal silicide, metal nitride, iron oxide, tin oxide, antimony doped tin oxide, zinc oxide, and a copolymer thereof.

5. The spectrometer of claim 1, wherein the colloidal particles are electrically charged.

6. The spectrometer of claim 1, wherein the responsive material is a conductive polymer.

7. The spectrometer of claim 6, wherein the conductive polymer comprises any one or any combination of polyferrocenylsilane, polythiophene, polypyrrole, polyaniline, polyphenylenevinyilene, polyacetylene, polyfluorene, polyvinylidene difluoride, and a copolymer thereof.

8. The spectrometer of claim 1, wherein the bandpass filter further comprises an upper substrate and a lower substrate, and
the photonic crystal layer is interposed between the upper substrate and the lower substrate.

9. The spectrometer of claim 8, wherein the bandpass filter further comprises:
an upper electrode disposed on the upper substrate; and
a lower electrode disposed on the lower substrate.

10. The spectrometer of claim 1, wherein the photodetector is a single photodiode.

11. The spectrometer of claim 1, further comprising a spectrum scanner configured to apply the electrical stimulation to the photonic crystal layer to measure optical intensities of different wavelengths.

12. The spectrometer of claim 11, further comprising a spectrum generator configured to generate a spectrum, based on the measured optical intensities of the different wavelengths.

13. A spectrometer module comprising:
a light source configured to irradiate first light onto an object;
a spectrometer configured to receive second light that is scattered from the object onto which the first light is irradiated, and measure a spectrum, based on the received second light; and
a processor configured to analyze a physical property of the object, based on the measured spectrum,
wherein the spectrometer comprises:
a bandpass filter comprising a photonic crystal layer having a reflection wavelength or a transmission wavelength that varies based on an electrical stimulation, the bandpass filter being configured to filter the received second light; and
a photodetector configured to detect the filtered second light,
the photonic crystal layer comprises colloidal particles and a responsive material, and the responsive material is configured to:
expand to increase spacing between the colloidal particles to reflect a third light of a first wavelength, based on a voltage being applied to the photonic crystal layer; and
contract to decrease the spacing between the colloidal particles to reflect a fourth light of a second wavelength, based on the voltage not being applied to the photonic crystal layer.

14. The spectrometer module of claim 13, wherein the scattered second light is reflected from the object onto which the first light is irradiated, or transmitted through the object onto which the first light is irradiated.

15. The spectrometer module of claim 13, wherein the physical property of the object is analyzed based on near-infrared absorption spectrometry or a Raman analysis.

16. A spectrometer comprising:
a bandpass filter comprising a photonic crystal layer that comprises colloidal particles and a responsive material configured to:
expand to increase spacing between the colloidal particles to reflect a first light of a first wavelength, based on a voltage being applied to the photonic crystal layer; and
contract to decrease the spacing between the colloidal particles to reflect a second light of a second wavelength, based on the voltage not being applied to the photonic crystal layer; and
a photodetector configured to detect the reflected first light and the reflected second light.

\* \* \* \* \*